US006775411B2

(12) United States Patent
Sloan et al.

(10) Patent No.: US 6,775,411 B2
(45) Date of Patent: Aug. 10, 2004

(54) APPARATUS AND METHOD FOR IMAGE RECOGNITION

(75) Inventors: Alan D. Sloan, 1266 Holly La., Atlanta, GA (US) 30329; Ruifeng Xie, Roswell, GA (US)

(73) Assignee: Alan D. Sloan, Atlanta, GA (US)

(*) Notice: Subject to any disclaimer, the term of this patent is extended or adjusted under 35 U.S.C. 154(b) by 1 day.

(21) Appl. No.: 10/274,187

(22) Filed: Oct. 18, 2002

(65) Prior Publication Data

US 2004/0076330 A1 Apr. 22, 2004

(51) Int. Cl.[7] .................................................. G06K 9/62
(52) U.S. Cl. ...................... 382/224; 382/190; 382/276; 358/1.6; 358/450
(58) Field of Search ................................. 382/181, 155, 382/190, 224, 276, 233, 932, 218; 700/17, 83; 706/21; 345/520, 810, 840; 358/426.04

(56) References Cited

U.S. PATENT DOCUMENTS

| | | | | |
|---|---|---|---|---|
| 4,644,582 A | * | 2/1987 | Morishita et al. | ........... 382/130 |
| 5,065,447 A | | 11/1991 | Barnsley et al. | |
| 5,347,600 A | | 9/1994 | Barnsley et al. | |
| 5,867,386 A | | 2/1999 | Hoffberg et al. | |
| 5,875,108 A | | 2/1999 | Hoffberg et al. | |
| 5,901,246 A | | 5/1999 | Hoffberg et al. | |
| 5,946,417 A | * | 8/1999 | Bonneau et al. | ............ 382/236 |
| 6,400,996 B1 | * | 6/2002 | Hoffberg et al. | ............... 700/83 |
| 6,424,725 B1 | * | 7/2002 | Rhoads et al. | ............... 382/100 |
| 6,643,387 B1 | * | 11/2003 | Sethuraman et al. | ........ 382/107 |
| 6,658,136 B1 | * | 12/2003 | Brumitt | ....................... 382/103 |

OTHER PUBLICATIONS

Sloan, A. D., Retrieving Database Contents by Image Recognition: New Fractal Power, Advanced Imaging, May 1994, 26–30.
Chen, K., Demko, S., Xie, R., Similarity–based Retrieval of Images Using Color Histograms, Proceedings of SPIE on Storage and Retrieval for Image and Video Database, Jan. 1999, vol. 3656.
Demko, S., Khosravi, M., Chen, K., Image Descriptors Based on Fractal Transform Analysis, Proceedings of SPIE on Storage and Retrieval for Image and Video Database, Jan. 1999, vol. 3656.
A User's Guide for Matchmaker for Windows, Version 1.1, Iterated Systems, Inc.

\* cited by examiner

*Primary Examiner*—Jayanti K. Patel
*Assistant Examiner*—Sheela C Chawan
(74) *Attorney, Agent, or Firm*—Arnall Golden Gregory LLP (57) ABSTRACT

An apparatus, method and computer program for recognizing one or more images within digitized image data that might include a target image desired to be located. The system generates a set of domain blocks from the image data where each domain block represents a discrete portion the image data and a set of range blocks from one or more target images. Either the domain blocks, the range blocks, or both, are transformed by one or more substantially affine transformations with predetermined coefficients to create possible variants of the images. A comparison between the blocks is made to determine similarity, and includes at least a measurement of whether better matching is achieved when a range block is chosen from image data representing the image which is the source of the domain block or when chosen from other image data.

32 Claims, 5 Drawing Sheets

APPARATUS AND METHOD FOR IMAGE RECOGNITION

BACKGROUND OF THE INVENTION

1. Field of the Invention

The present invention generally relates to computer systems for image processing. More particularly, the present invention relates to apparatuses and methods to automatically search image data to detect the presence, or likelihood of presence, of specific target images.

2. Description of the Related Art

There are several systems that analyze data to detect the presence of specific images in data. Analog images can occur in a variety of media including photographs, photographic slides, television images in various formats including HDTV, images on computer monitors, holograms, x-rays, sonograms and radar. The analog imagery can be digitized and thus represented by an array of pixels where each pixel may be determined by one or more spectral bands of digital data. As examples, a digital image can be a 1024×1024 array of pixels where each pixel is specified by a 0 or a 1 denoting black or white respectively, or an integer between 0 and 255 denoting 256 shades of gray, or 3 integers between 0 and 255 denoting a red, blue and green component, respectively with 256 levels for each component, or an integer between 0 and 1023 denoting 1024 infra-red levels, or 256 integers each between 0 and 255 and each denoting the output at a different spectral level from a multi-spectral satellite sensor. Digital imagery can also be created directly through computer graphics software and systems as well as through imaging sensors whose output is natively digital.

There are many existing applications that utilize some form of image recognition within a set of data, such as fingerprint identification, quality control for manufacturing, optical character recognition on scanned documents, automatic target recognition for weapons systems, and face recognition. A critical function of these systems is to indicate the likelihood of a match when a target image is indicated by the image data. And in circumstances where the image data is voluminous, such as satellite data or all images available on the Internet, human review for all of the data is impractical.

The prior art image recognition methods generally fall into two categories: constrained and unconstrained. Constrained methods of image recognition work only with images that have a specific structure. For example, one commercial application that performs face recognition based on biometrics requires the calculation of distances between eyes, and between nose and mouth, and may rely on other like relational computations. Such a face recognition calculation normally does not make sense on a general type of image, such as a boat or airplane, since the underlying structure of an image of boat or plane is not the same as that of a face. More generally, constrained image recognition methods are typically not effective on imagery without the specific structure assumed by the method since the sought image may have very different relational aspects than the target image, yet still satisfy the search criteria.

Constrained methods, however, typically require relatively high quality imagery such that the underlying structure of the images that are analyzed by the recognition method can be observed and this would not be suitable for use in poor quality image data. For example, a drug enforcement agent may take a photograph of an individual in a moving car and obtain a blurry image, or may take a telephoto picture of a subject and later want to identify other people in the background of the photo who may be severely out of focus. Another problem occurs in video imagery of a crowd scene, such as at a football stadium, where very tiny images of large numbers of people are present. Once the imagery is too small, or too out of focus, or too blurred, the calculations required in the constrained biometric face recognition system cannot be performed accurately. More generally, once the quality of imagery is too poor, any constrained system cannot take advantage of its underlying structural assumptions and then fails to perform accurately.

On the other hand, unconstrained image recognition systems do not utilize the underlying structure of an image as a basis for comparison, and thus do not suffer the same problems in reviewing low quality image data. Prior art unconstrained image recognition systems however do not work well with complex imagery. For example, given two images A and B, specified by square pixel arrays of data, where each pixel is specified by an integer between 0 and 255, one measure of the difference, $\|A-B\|$, between A and B is the square root of the sum of the square of difference between the corresponding pixel values. In such manner, A and B would be said to be similar when $\|A-B\|$ is small. However, this measurement may be very large, even when the difference between A and B is barely noticeable For example, create an image B from an image A where all columns of pixels of image A are shifted to the right by one pixel, and a new column of pixels is added at the left which just duplicates the new second column. If A is a 1024×1024 image, A and B will look very similar to a human observer. For example, if A is a picture of a boat, then B will also look like a boat, slightly shifted to the right. However, $\|A-B\|$ may be large since every pixel in A will be different from the corresponding pixel in B. In some practical image recognition applications, it is desirable to recognize whether one or more objects in image A are also present, or absent, from image B, not only when they are slightly modified digitally as in the above example, but when they are acquired under very different conditions. Examples of such disparate acquisition conditions include different image acquisition times leading to different conditions of use, with different cameras or other sensors, from different distances from sensor to object(s) or scenes, at different perspectives, under different lighting conditions, different environmental conditions, and in the context of different backgrounds and in the presence or absence of other objects. Moreover, the target object(s) of interest may be partially obscured in a different manner in A and B, and may be rotated, scaled and translated relative to each other or to the background. Additionally, imaging systems and computer software may further distort the imagery, such as through the application of compression to facilitate storage and transmission and such as through insertion of special effects. Prior art unconstrained image recognition methods do not deal effectively with the complexity arising from significantly different conditions of image data acquisition.

Accordingly, it is desirable to have an improved system for image recognition that can adequately search realistic imagery data for the presence of target image(s) and/or image object(s) and successfully indicate the likelihood of target image(s) and/or image object(s) being present, even when the searchable imagery data and target imagery have significantly different conditions of acquisition. Such system should be unconstrained by the target image or searchable image data structure and allow for variation in the appearance of the target image within image data. It is to the provision of such an apparatus and method for recognizing images within digitized data that the present invention is primarily directed.

SUMMARY OF THE INVENTION

The present invention is an apparatus, method, and computer program that can recognize specific images within a collection of digitized image data, or at least indicate the likelihood that a specific image is contained within the image data. In the system, a processor can either receive image data in a digital format or itself digitize data into target images, the collection of which forms the searchable image data. In the system, a processor also can either receive other image data in a digital format, or itself digitize data into query images. The system then generates a set of domain blocks from one or more query images with each domain block representing a discrete portion the query image data. A set of range blocks is then generated from the query image(s) and a predetermined one or more target images that are desired located within the searchable image data, with the range blocks corresponding to discrete portions of the one or more queries and the target images from the searchable image data. To get additional potential appearances of the images, the range blocks are transformed by one or more substantially affine transformations with predetermined coefficients, such as an affine transformation which is one composed of translation, scaling and rotation operations in the spatial and spectral data. A substantially affine transformation is one which can be continuously approximated locally by affine transformations.

The system uses a predetermined method of comparing image regions consisting of predetermined configurations of pixels, such as the square root of the sum of the squares of the corresponding pixel values when the image regions consist of identically sized rectangles. Each domain block is then compared with one or more of the range blocks, and while comparing, generating classification data based upon a comparison of the domain block with such range blocks, the classification data including the comparison result, geometric information relating to the locations and descriptions of the range blocks, specifically including whether the range block originated from the query image or from the collection of searchable imagery, and the description of the substantially affine transformation, if any, which was applied to create the range block data. A determination of the likelihood of at least a specific portion of one or more query images being similar to specific portions of the searchable image data can be made based upon the classification data aggregated over the collection of domain blocks, using at least a measure of the extent to which domain blocks compare less closely to range blocks chosen from the query image(s) than to range blocks chosen from specific portions of the searchable image data.

The present invention attempts to accurately classify images that are likely to contain similar target images rather than specifically seek an exact match. In classification, the goal is not to exactly identify a target image but rather to categorize the image data (or the specific portions of the image data such as domain blocks) as to their likelihood of containing the target image. The present invention accordingly applies to classification as well as identification.

The one or more target images can be selected from the searchable image data itself, and in such manner, other like objects can be located within the object data. Further, the image data can be preprocessed in a predetermined manner after receipt thereof, such as through substantially affine transformations, scaling the image data to a pre-determined size, segmenting the image data, purposely blurring or altering the image data, or marking certain image areas to be ignored during the comparison of each domain block with one or more range blocks. And the steps of image recognition can be iterated to further review either specific or all of the image data based upon the classification data.

The substantially affine transformations create different views and appearances in the searchable image data or in the query imagery or in both, allowing the system to indicate a high likelihood of similarity even when the query imagery is acquired under different conditions from the searchable image data. Additionally, the system can indicate a high likelihood of similarity even when the query imagery represents partial views of objects in the searchable image data, or partial views of the searchable image data, since the comparison data can be high when those partial views are represented in the searchable image data.

The classification data can be chosen so that maximum similarity is indicated only when each domain block of the target image is a substantially affine transformation of at least one range block. In many cases of real image databases, this theoretical condition of maximum similarity is enough to imply that maximum similarity is indicated only when the two images are identical. And in one embodiment, the likelihood of similarity is determined by using a function of two variables with values between 0 and 1 and the first variable is a specific portion of a query image and the second variable is a specific portion of the image data.

A correlation of image data among different target images and/or query images can also be utilized along with the classification data to increase the accuracy of the invention. For example, one or more of the target images can be very similar images of the same object such as successive frames of video. In such a case, the extent to which the classification data of such similar images is itself correlated may be included in the classification data of one or more of the similar images. By aggregating classification data from different target images, the nature of target images can be extended to include sets of target images, such as video sequences, or other sets of images related in some manner. Similarly, the nature of query images can be extended to include sets of query images and the classification data can be extended to included classification data of such extended sets of target and query images. The invention can also be utilized whether the target and query images are individual images or more general collections of correlated image data. This correlation aspect of the invention can be applied to instances of searchable image data even when there is no a priori knowledge of the similarity of images within such data through selecting some or all such data to be query images and using the classification data thereby generated to determine the similarity of images within such data, and thereafter utilize the approach of correlation. The correlation of image data within one or more target and/or query images can also be utilized along with the classification data to increase the accuracy of the invention and reduce the overhead and cost of utilizing the invention.

The present invention therefore provides an improved unconstrained system of image recognition that searches realistic, imperfect imagery data for the presence of target images and successfully indicates at least the likelihood of one or more similar target images being present. Through the use of substantially affine transformation, segmentation, and other data manipulation, variations of target images can be located within the image data even though the target image has a significantly different visual relationship or appearance within the image data.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
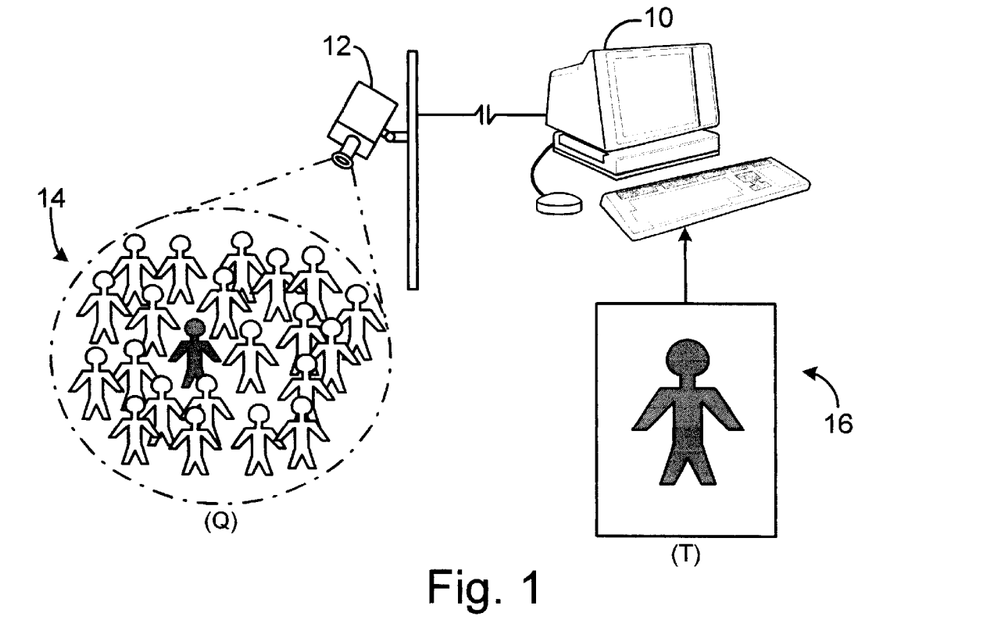
FIG. 1 is a perspective view of an apparatus for recognizing images utilizing a computer and an image capture source acquiring a Query (Q) image for review to determine the presence of a Target (T) image.

With reference to the figures in which like numerals represent like elements throughout, FIG. 1 is perspective view of an apparatus for recognizing images utilizing a computer 10 or other processor and an image capture source 12 that acquires a Query (Q) image 14 from a field of vision. A target image (T) 16 is input into the computer 10 and the query image 14 is reviewed for the presence of the target image 16 as is further described herein. In searching the image data, the present apparatus and method utilize a known method for processing image data as described in U.S. Pat. No. 5,065,447. Further, the concept of using fractal geometry to perform pattern recognition was described in U.S. Pat. No. 5,347,600. The subject matter of both patents being fully incorporated herein by this reference. It should be noted, however, that no claims of either of these patents relate to image recognition. Moreover, a prior method of using the results of the image processing methods contained within the '447 and '600 patents was discussed in Sloan, A., Image Recognition for Retrieving Database Contents, Advanced Imaging, May 1994, pp.26–30. This prior method involves computing a measure M(Q,T) of the similarity of two images Q and T using fractal geometry. Given an image A, one can specify geometrical sub-regions of A by describing their shape and location. For example, one such sub-region may be a 4×4 array of pixels whose upper left hand corner coincides with the upper left hand corner of A.

Figure 2:
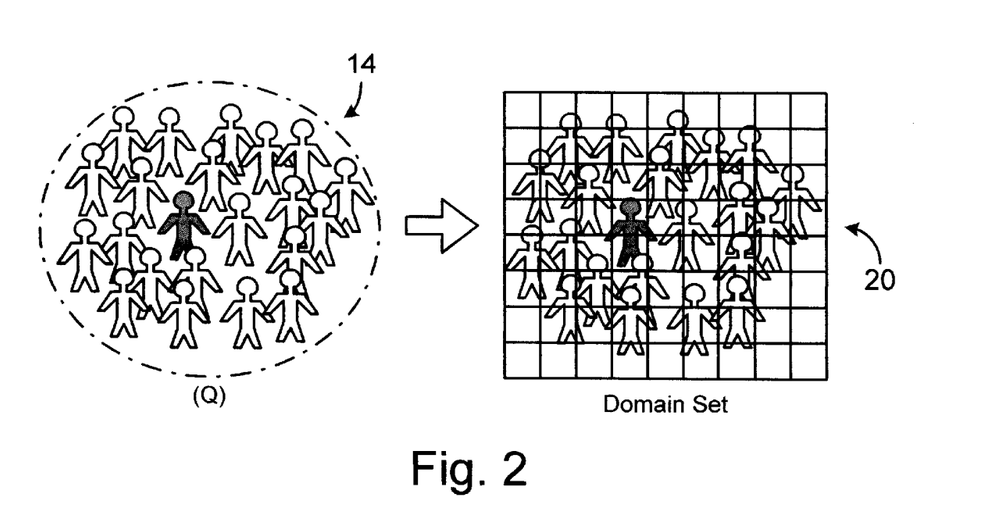
FIG. 2 is a diagram illustrating the transformation of the Query (Q) image into a set of domain blocks.

Thus, as shown in FIG. 2, the query image 14 can be partitioned into a set of blocks, called domain blocks 20. The specific process to measure the similarity of images is as follows:

(a) Choose a partition, U, of sub-regions of Q, to create "domain" blocks, i.e. the union of the set of nonintersecting domain blocks equals Q.

(b) Choose another set, V, of image sub-regions, called "range" blocks that can either be sub-regions of Q or of T.

(c) Choose a set, W, of transformations S, where each such S maps some of the range blocks into domain blocks and where every domain block is mapped into, in this way.

(d) Choose an image metric $\|(A, B)\|$ which measures the distance between two image regions A and B.

(e) Initialize M(Q,T)=0.

For each domain block D of Q in any order, f.1 Compute minimum $\{\|(D, S(R))\|$: S is in W and R is in V$\}$ and let $S_D$ be the transformation, S and $R_D$ be the range block R for which the minimum occurs.

f.2 If R(D) is contained in T, then increment M(Q,T) by 1.

Then, normalize M(Q, T) by the dividing by the number of domain blocks in Q, so that M is always between 0 and 1.

However, the prior derivation of M has several problems with regard to its application in pattern recognition. For example, if N is the number of Domain Blocks in Q, then M(Q,T) is always of the form k/N for some number k between 0 and N. If Q is an image with L×L pixel resolution and the Domain Blocks are d×d in pixel resolution, then the number, N, of Domain Blocks in Q is $(L/d)^2$. If d=4 for example, then:

| L | N |
|---|---|
| 32 | 64 |
| 256 | 4096 |
| 4096 | ~1 M |
| 4 M | ~1 G |

Consequently, N represents a theoretical limit on the number of images in a database for which the above method can distinguish among using images Q of resolution L×L, which limits the recognition accuracy of the method. Any attempt to increase the recognition accuracy by increasing the resolution by attempting to acquire, store, access and communicate and the higher resolution images leads to higher costs and longer processing and delay times. Thus, outside of some limited range, it is impractical to deal with high-resolution pictures. Such is the reason that most digital cameras acquire images having pixel areas ranging from hundreds of thousands to millions of pixels rather than billions of pixels. Moreover, in many image recognition applications, images themselves are not available at such resolution. For example, video of a crowd scene from a sporting event which has already taken place may contain faces only at a small resolution, for example pictures at 20×20 pixels. Third, the computation required in the calculation of M(Q,T) increases as the fourth power of L, if both Q and T have resolution L×L. This means the cost of a system implementing this method increases rapidly, and after some resolution, becomes impractical. Fourth, large databases, such as satellite photographs, tend to have so many images that a significant level of accuracy of M is necessary to provide a valid indication that a target image may be present or else the resources necessary to review the data are too great. However, the level of accuracy of M is directly related to the theoretical limit of how many images M can distinguish between. These reasons explain why the prior method was not adopted for use in practical applications.-

One way of understanding the difference between constrained and unconstrained systems is through the scope of the problem each respectively addresses. For example, consider binary images of pixel dimension 32×32. There are $2^{(32\times32)}$ such images. Since any image difference could be of potential importance for some application, an optimally effective unconstrained system would need to be able to distinguish, in principle, between any two such images. On the other hand, suppose the problem was to consider only 32×32 binary images where one pixel was non-zero. There are only $2^{10}$, or approximately one thousand, such images. Therefore, a constrained system designed to work with only 32×32 binary images with exactly one non-zero pixel would need, in principle, to distinguish between approximately one thousand images to be optimally effective. Some unconstrained systems are in fact be only able to distinguish between a relatively few images. For example, suppose the prior method discussed above was applied to gray scale images with 256 intensity levels and pixel resolution L×L. That method is apparently unconstrained since it can, in principle, deal with any such image. However, it maximally distinguishes, in principle, at most $L^2$ images and this occurs for the choice d=1, even though there are $((256)^{(L^2)})$ such images. When the ability of an apparently unconstrained system to distinguish between images is so severely reduced, it is termed "implicitly constrained," rather than unconstrained. That is, even if there are no a priori limitations based on an underlying image structure for an image recognition system, the prior art system can, in principle, only distinguish between at most H×V images, where H is the horizontal resolution and V is the vertical resolution. Through the determination of the likelihood of similarity, the present invention does not have these implicit constraints in image recognition and can adjust the likelihood by accounting for any errors inherent in the block generation and comparison process as is further defined herein.

Figure 3:
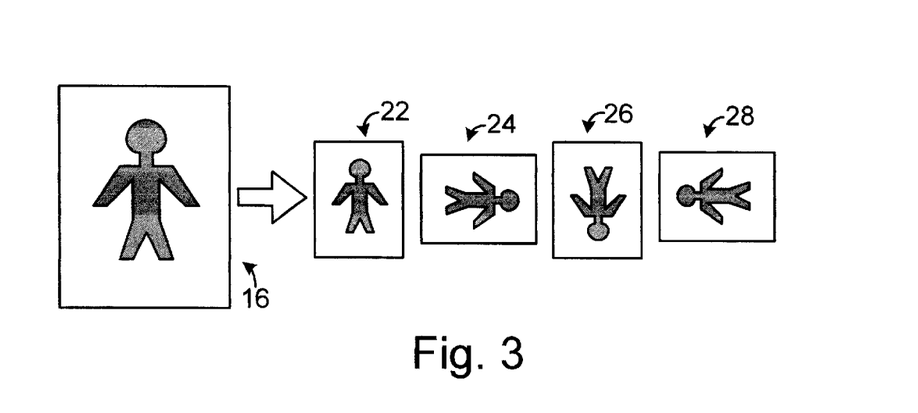
FIG. 3 is an illustration of the transformation of a Target (T) image through a series of affine transformations into a set of range blocks.
Figure 4:
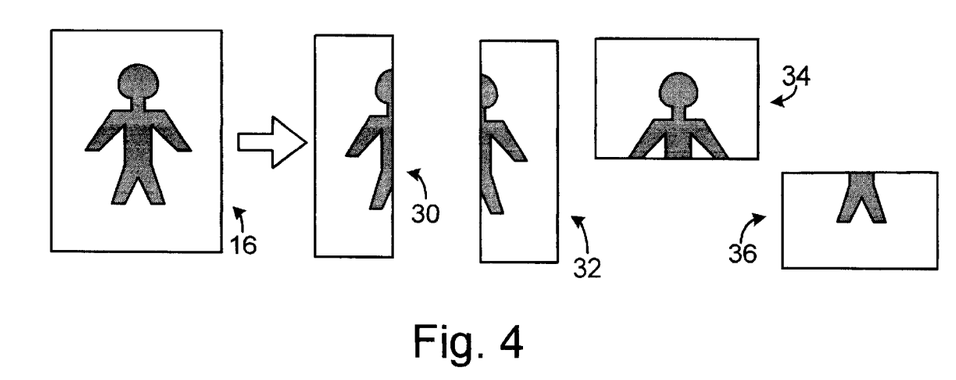
FIG. 4 is an illustration of the transformation of a Target (T) image through segmenting the target image into a set of range blocks.
Figure 5:
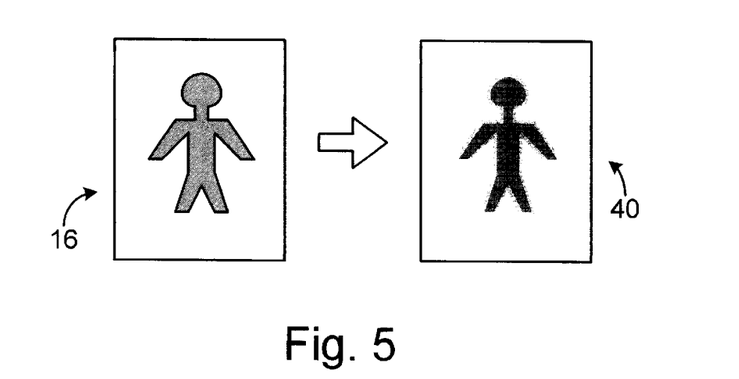
FIG. 5 is an illustration of the transformation of a Target (T) image through blurring and color alteration into a range block.

As shown in FIGS. 3–5, the present system performs transformations at least on the target image 16, which can be separately entered into the system or obtained from the image data itself, to obtain possible variants on the target image 16 that may appear in the image data. In FIG. 3, the transformation of a Target (T) image occurs through a series of affine transformations of the target into a set of range blocks, which here is both downward scaling of the target image 16 and rotation of the image through 90° increments. Thus, the target image 16 is simply downwardly scaled for target image 22, then rotated 90° right in target image 24, then 90° right again for target image 26, and finally 90° right again to obtain target image 28. Thus, a wide range of potential variants of the rotation of the target image is generated.

Figure 6:
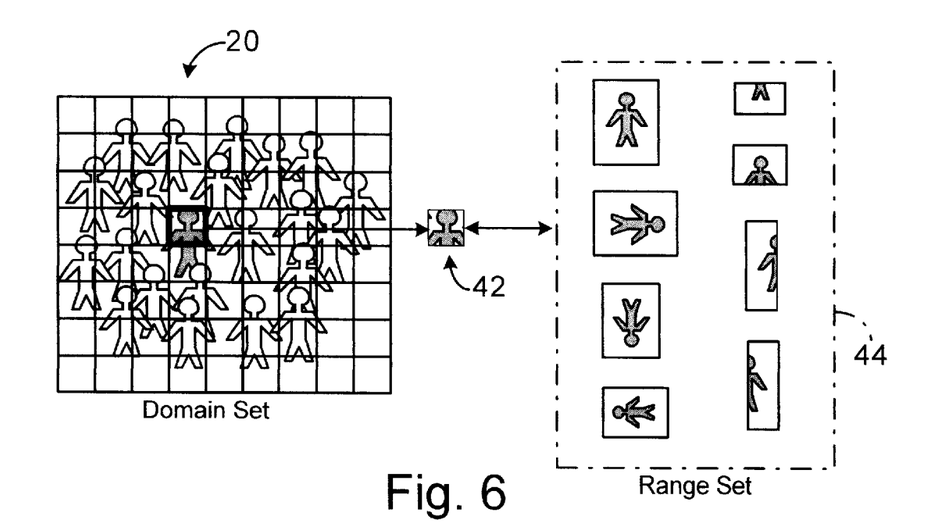
FIG. 6 is a diagram illustrating the searching of a specific block in the domain set for the similarity to a range set of blocks generated in FIGS. 3 and 4.

FIG. 4 is an illustration of other transformations of the target image 16 through segmenting the target image 16. The target image 16 is thus segmented into a left vertical segment image 30 and a right vertical segment image 32, and a top segment image 34 and a bottom segment image 36. Accordingly, all of the target images 16,22,24,26,28,30,32,34,36 are aggregated into a range set 44 of target image range blocks as shown in FIG. 6. Further possible transformations of the target image 16 are possible, such as blurring and color alteration as shown in FIG. 5. With use of segmentation, known correlations between specific portions of a target image 16 or different target images can be determined to be consistent with correlations between portions of image data otherwise determined to be similar. For example, the appearance of half of the image, e.g. image 30, can infer that the target image is present.

In FIG. 5, the target image 16 is both blurred and has underlying color altered into a target image block 40. Through such transformation, both blurred images that are likely to occur in the image data and changes in color of the image, e.g. painting a boat a different color or a person altering their appearance, can be searched. To one of skill in the art, it is clear that other types of transformations may be similarly included or excluded, including but not limited to transformations of the spectral and/or variables by varied amounts comprised of (a) scaling, rotation and translation operations, (b) averaging varied groups of pixels using different weighting functions such as Gaussian and motion blurring, (c) perspective transformations and (d) functions which can be locally approximated by such functions in a continuous manner, either alone or in composition with each other. It can thus be seen that the search of variant target images can be selectively included or excluded from the range set 44 or can be generated in successive iterations of the recognition process as is further described herein.

FIG. 6 illustrates the searching of a specific domain image block 42 in the domain set 20 with a range set 44 of blocks generated in FIGS. 3 and 4. Normally, for each such domain block such as block 42, each block of the range set 44 will be compared thereto to determine the likelihood that the target image 16 is present. Domain block 42 is selected to illustrated that, as it contains an upright image of the upper torso of the person of the target image 16, the block 42 will exhibit the strongest similarity to target image 34, i.e. M(Q,T) approaching 1, and will have some similarity to target images 16 and 22, i.e. M(Q,T) less than 1 but non-trivial.

One difficulty with the prior art method described above is that the M(Q,T) function reflects the extent to which that method does not have the property: M(Q,T)=1 if and only if Q=T. In the prior art method, M(Q,T) was always between 0 and 1, and in certain cases M(Q,Q)=1, but in other cases M(Q,Q)<1. Since the prior art method intends that larger values of M(Q,T) means greater similarity between Q and T, one method of attempting to increase the value of M(Q,Q) was by spatially scaling the image comprising the second argument of M by a factor equal to the reciprocal of the spatial scaling factor in the transformations S in W. The general class of transformation included spectral scaling as well, i.e. the processing of the images into domain blocks, and for this reason, it was still possible for M(Q,Q)<1. To increase accuracy and lessen this scaling problem, the present system includes replacing each set T by the result of applying the inverse of each S occurring in the calculation of M(Q,T) to T prior to using it in this calculation.

The present system corrects the theoretical and practical limits of the prior method to distinguish between large numbers of small images through one or more error checking steps while compare domain blocks with range blocks. In the following notation, define V(T) to be those range blocks which are in T and V(Q) to be those range blocks which are in Q. For each domain image block, D in Q, the error in representing the domain image blocks by S(R) is computed for all predetermined transformations S and predetermined range image blocks R. Here S(R) is therefore the result of applying the transformation S to the range image block, R. This error is defined by $\|(D, S(R))\|$ and denoted by ERROR(D,S,R).

The process for error correction is then:

---

(f') For each Domain Block D of Q, in any order
    f'.1 Compute ERROR(D,Q)
    =min {ERROR(D, S, R): S in W, R in V(Q)}
    f'.2 Compute ERROR(D,T)
    =min {ERROR(D, S, R): S in W, R in V(T)}
    f'.3 If ERROR(D,Q) > ERROR(D,T), then
    {increment M(Q,T) by
    (ERROR(D,Q)−ERROR(D,T))/ERROR(D,Q)}

---

If M(Q,T)=1, then each domain image block of Q is locally a transformation of some range image block of T. Conversely, to the prior unconstrained method, M(Q,T)=1 implies that Q=T locally meaning that each domain image block of Q equals a range image block of T. For many practical collections of query and target images, it turns out that M(Q,T)=1 if and only if Q=T.

This error correction methodology is best used on certain transformations; for example, if the transformations include rotations by 90° clockwise as shown in FIG. 3, then M(Q, T)=1 implies that each domain block of Q locally equals a domain image block of T, or a 90° clockwise rotation of a domain image block of T. In many searches, the orientation of an object is not material to its classification or identification, and this aspect of the present invention permits identification or classification independent of orientation. This use of transformations of the target image makes no assumptions of underlying structure, and consequently, recognition performance on imagery of poor quality degrades smoothly over a wider range of image variations in contrast to constrained or implicitly constrained methods.

Figure 7:
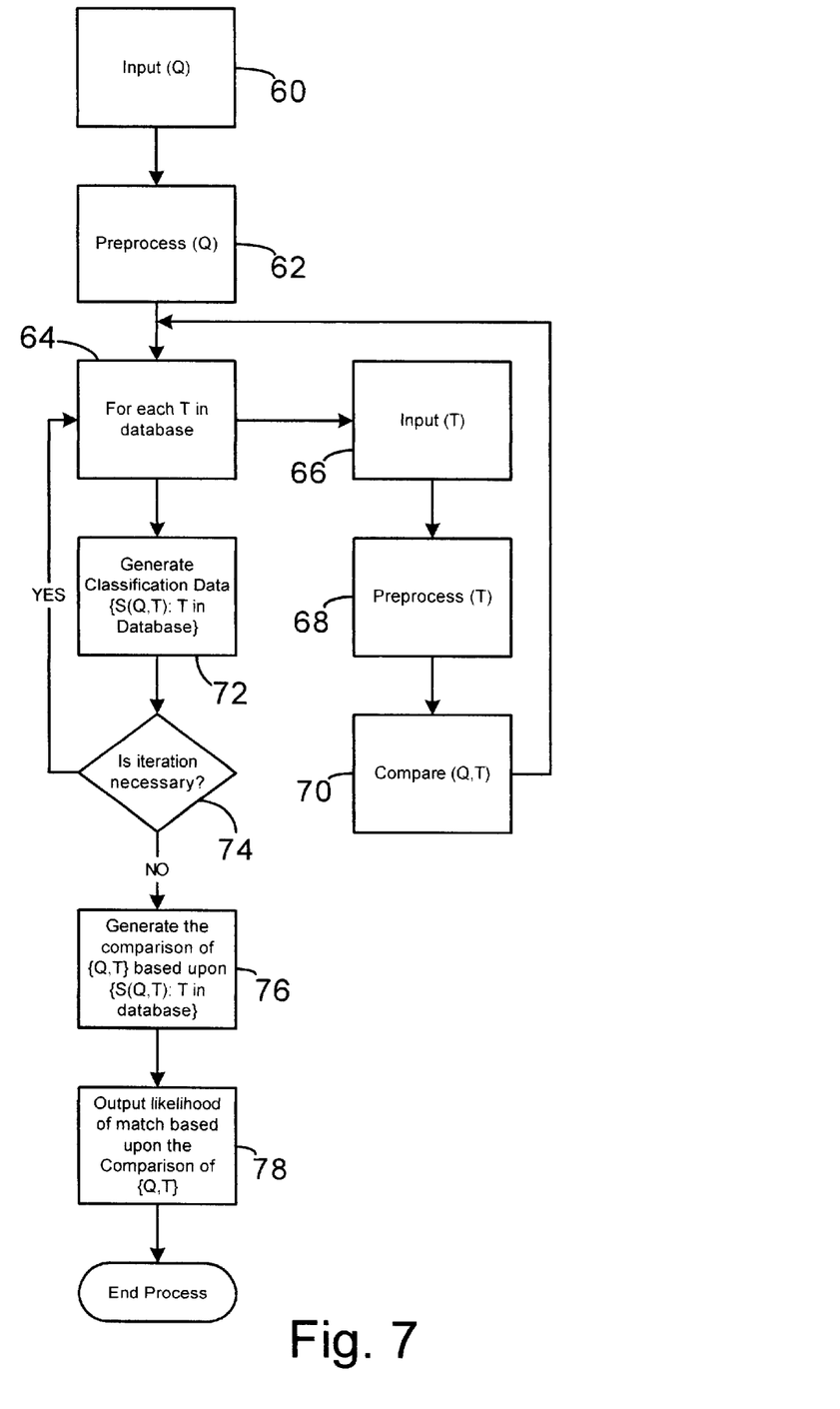
FIG. 7 is a flowchart of a basic embodiment of the process of image recognition of one or more target images within digitized image data.

FIG. 7 is a flowchart illustrating the process of a basic embodiment of image recognition of one or more target images within digitized image data. Image data is input, likely although not necessarily containing a query image (Q), as shown in step 60, and a database of target images (T) is determined either from an input target image 16, or a portion of the image data containing an image desired to be located within other portions of the target data can be used to generated the target image. Both the image data and target images can be received from one or more sources including one or more databases, local or remote to the processor, computer memory in any format, computer storage devices such as hard disk, floppy disk, CD-ROM, and DVD, one or more live digital video sensors such as a video camera, CCD, infrared image sensor and satellite image sensor, digital still camera, scanned photographic film, slides, developed pictures, digitized video from analog sources whether stored or live in any format, digital and digitized medical images such as x-rays, sonograms, cat-scans, magnetic resonance images, and digital and digitized military images such a radar, sonar, projectile tracking sensors and night-vision sensors.

The input image data is then preprocessed to generate possible variants in the domain set, as shown at step 62. This step of preprocessing can be done to the image data (Q), the target image (T), or both. The preprocessing can include, without limitation: substantially affine transformations, scaling images to pre-determined size, cropping images to pre-determined size, histogram equalization, changing the perspective of images (for example taking overhead surveillance photographs obtained at various oblique angles and processing to estimate or approximate photographs taken at differing angles) and such other techniques so as to increase uniformity of the images relative to subsequent pre-preprocessing, scaling and cropping images to possibly different sizes depending on image content. An example is segmenting faces from images of heads, or heads and torsos, or full bodies as shown in FIG. 4, and then, for each image, choosing one scaling factor each of the horizontal and vertical dimensions so that each segmented face has the same horizontal and vertical resolution, or same area by maintaining or relaxing constraints on aspect ratios.

The preprocessing can further include decreasing the image data for the purpose of improving utility and or speed including but not limited to (i) marking certain image areas to ignore, with examples being common smooth regions, common color regions such as hair on head images or water in images of ships, and such marking may be interactively performed by an operator of the system, or creator or editor of the image, or automatically by a computer program or other image processing system, and (ii) marking certain images to ignore such as successive video frames where little or no change occurs. The preprocessing can likewise include increasing the image data for the purpose of improving utility, for example, computing variations on the received image data to represent transformed versions of the received image data, where such transformations may include but are not limited to (i) rotations by pre-determined angles, scaling by pre-determined factors, (ii) cropping at predetermined intervals, (iii) blurring to simulate images which are out-of-focus by pre-determined amounts, (iv) blurring to simulate images which were obtained by relative motion and acceleration of camera an subject, (v) lighting transformation to simulate images created indoors by different types, numbers and positions of light sources, (vi) lighting transformations to simulate images created outdoors at different times of day, at different times of year and under different weather conditions, (vii) perspective transformations to simulate images obtained by cameras at different orientations to the subject, and (viii) lens transformations to simulate images produced by one or more lenses from images representing images produced by other lens(es), such as the image produced by a fish-eye lens.

The process then computes a comparison measure between Q and each T, or Compare (Q,T), by first obtaining each T in the database, as shown at step 64, and for each T, T is input as shown at step 66, and then preprocessed to generated a possible range of variants as discussed above, as shown at step 68, and then a comparison is made for that T and its variants to Q, as shown at step 70. In one embodiment, each query image Q and target image T are gray scale images with pixel values ranging from 0 to 255 so that each pixel may be represented by 1 byte of data. If the pixel dimensions of Q are not a multiple of 4, then either 1, 2, or 3 rows and/or columns are cropped in the preprocessing step so that the resulting image has horizontal and vertical pixel resolutions which are multiples of 4. The domain blocks are 4×4 squares of pixels. The domain blocks are then uniquely specified by further requiring they form a partition of Q and so are non-overlapping. Each T is pixel doubled in its pre-processing step so that its new dimensions are twice the original dimensions. The range blocks are taken to 8×8 squares of pixels where the upper left hand corner of each square has pixel coordinates that are a multiple of 2. Next, new range blocks are created by rotating existing range blocks by 90, 180, 270 degrees clockwise and added to the original collection of range blocks to form an expanded set of range blocks. In the preferred embodiment, the distance between two square blocks, A and B, of pixels having pixel dimension 4×4 is defined by $\|A-B\|$=square root of sum{Square[(A(i,j)−B(i,j))]: 0<i,j<5}, where pixel in ith row and jth column of A and B is A(i,j) and B(i,j), respectively.

This embodiment makes use of a transformation which takes 8×8 squares of pixels into 4×4 squares of pixels by averaging as follows: For any square array of pixel data, C, with pixel dimension 8×8, define AVG(C) to be the 4×4 square array of pixel data with pixel value in the ith row and jth column=(¼)(C(2i,2j)+C(2i+1,2j)+C(2i,2j+1)+C(2i+1,2j+1)), where 0<i,j.<5.

This embodiment also employs additional transformations defined as follows. For any square array of pixel data, C, having pixel value C(i,j) in the ith row and jth column, and any real numbers p and p', the transformation G(p,p') from square arrays of pixel data to square arrays of pixel data, by specifying that the pixel in the ith row and jth column of G(p,p') applied to C, is p*C(i,j)+p', it being understood that if the resulting pixel value is below 0 it is reset to 0 and if it is above 255, it is reset to 255. This resulting pixel array is denoted by G(p,p',C). The set, W, of transformations, S, is applied to each range block, R, whether in Q or T, where S(R)=AVG(G(0.75,p,R)), for p any integer satisfying −256<p<256.

Thus in the preferred embodiment, for each domain block D in Q, and for each range block R in T, are comparable and they are compared as follows. For each domain block D in Q and range Block, R, and S in W, compute ERROR(D,S,R)=∥D−S(R)∥. If the process has reached not the last range block, then choose next R. Once all range blocks have been so processed, the similarity S(Q,T) of Q and T can be computed.

In the preferred embodiment, the similarity is defined by means of descriptor are defined by:

DES(D,Q)

=min {ERROR(D, S, R): S in W, Range Block R in Q}; and

DES(D,T)

=min {ERROR(D, S, R): S in W, Range Block R in T}. Where it is understood that in the preferred embodiment T has been pixel doubled and images preprocessed and range blocks extended as described above. Then initialize S(Q,T)=0.

for each domain block D in Q, in any order,

If ERROR(D,Q)>ERROR(D,T), then

{increment S(Q,T) by (ERROR(D,Q)−ERROR(D,T))/ERROR(D,Q)}

Continue until all domain blocks D in Q, have been so processed. S (Q,T)=min {ERROR(D, S, R): S in W, Range Block R in pixel duplicated T}.

After the database of T has been iterated through, the classification data is generated based on {S(Q,T): T in Database}, as shown in step 72. Then a determination is made as to whether iteration of the recognition process is necessary, as shown at decision 74. The determination of iteration can be made based upon any criteria that would indicate that the first iteration was unsatisfactory, such as too many or too few domain blocks being indicated as likely matches. Thus, if iteration is indicated at decision 74, then the process return to step 64 and can generate a new database of T, changing one or more of the input, pre-processing and/or block generating parameters, and then again generate classification data based upon the new calculation at step 72. If an iteration is not indicated at decision 74, the generation of the comparison of {Q,T} based upon {S(Q,T): T in Database} is performed as shown at step 76, and the likelihood of matched based upon the comparisons of {Q,T} are output as shown at step 78. The process of recognizing images then terminates. In one embodiment, the step of iteration is omitted so as to optimize the process for speed. In another embodiment, images T in the database are reordered whereby the first image is the one with the highest S(Q,T), the second image is the one with the second highest S(Q, T) and in general the nth image is the one whose score is the nth highest. In the case of tie scores, the relative ranking of images having a given score is chosen randomly. The mostly likely image T to be similar to Q is then the first one. The next most likely image to be similar to Q is then the second one, and so on and these likelihoods are output at 78.

The likelihoods output at 78 of the preferred embodiment solve the pre-screening problem. In this problem there is an image analyst who needs to review large numbers of images T to find one similar to Q, but who only has time to review a small number of them, e.g. 1%. In the absence of additional information or process, the analysts simply chooses 1% of the images to review at random. If the analyst finds one that is similar to Q, then he is successful. However, if he doesn't find a T which is similar to Q, then he has no information about whether there is an image in the 99% of the imagery which he did not look at which in fact is similar to Q. Using the likelihoods output at 78, the analyst would look at first 1% of the T's which have the highest S(Q,T) scores. Even if the analyst does not find an image which is similar to Q, the analyst can have confidence that the other unreviewed images are even less likely to be similar to Q.

Figure 8A:
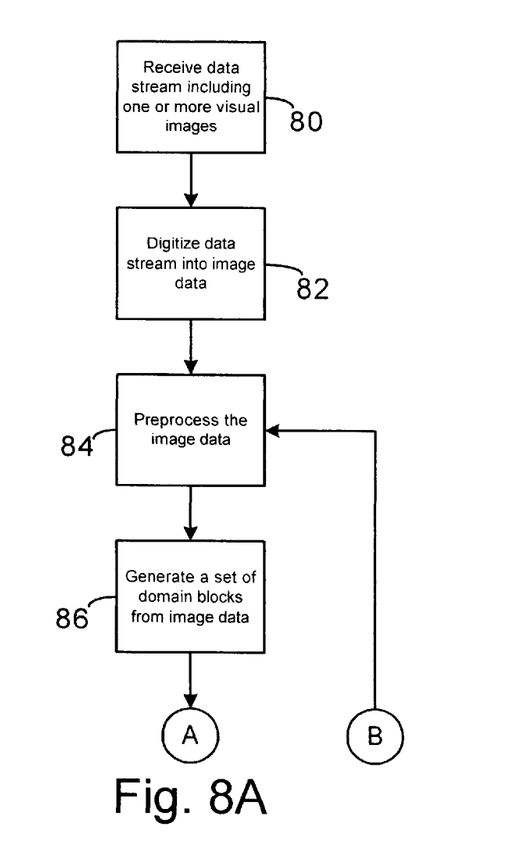
FIG. 8A is a flowchart of an enhanced embodiment of the process of image recognition of one or more target images within digitized image data.

FIG. 8A is a flowchart of an enhanced embodiment of the process of image recognition of one or more target images within digitized image data. The image data is received in an image data stream as shown at step 80, and the image data should include one or more visual images that can be searched. It should be noted that the image data may contain no actual images whatsoever and thus, the process can occur and generate M(Q,T)=0, but it is preferred that process only occur when searchable images are present due to overhead necessary to engage in the recognition process. The data stream is then digitized into image data as shown at step 82, and then the image data is preprocessed as described above, as shown at step 84. A set of domain blocks (20 in FIG. 2) is then generated from the image data as shown at step 86, which is also shown in FIG. 2.

The target image 16 is then received as shown in step 88 and at least one or more substantially affine transformations are performed on the target image 16, as shown at step 90. One example of substantially affine transformations is shown as performed to a target image in FIG. 3. A set of range blocks are then generated as shown at step 92, and for each domain block of the domain set, each domain block is compared with the set of range blocks (Such as range set 44 in FIG. 6), as shown at step 94. A determination is then made during each comparison as to whether the blocks are comparable, as shown at decision 96.

If the blocks are not comparable at decision 96, then the process forwards to determine if the last domain block has been reached at decision 106, which is more fully described below. If the blocks are comparable at decision 96, then a second block is generated for the domain block, as shown at step 98, which is for determining any error occurring in M(Q,Q). Then the second block is compared with the first domain block as shown at step 100, and a determination is made as to whether the first match between the domain block and the range block (M(Q,T)) is greater than the first and second domain block (M(Q,Q)), as shown at decision 102. If the level of matching is greater at decision 102, the classification level is stored noting the greater matching, as shown at step 104. Thereafter, or if there was not a greater level of matching at decision 102, a determination is then made as to whether the last domain block has been reached as shown at decision 106.

Figure 8B:
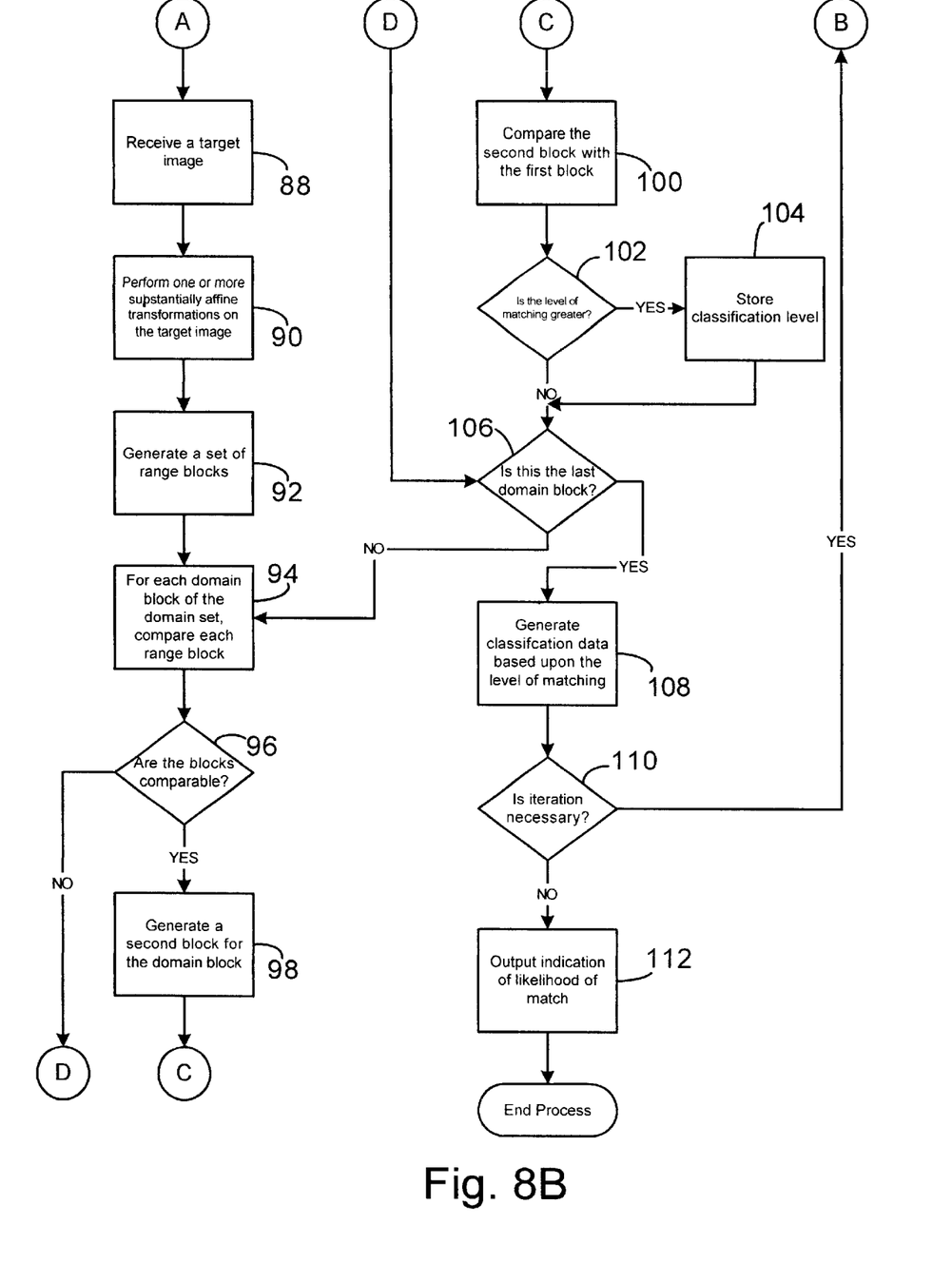
FIG. 8B is a continuation of the flowchart of FIG. 8A.

If the last domain block has not been reached at decision 106, then the process iterates to fetch the next domain block at step 94. It should be noted that the order of block comparison can be done in many different orders. For example, all range blocks from the range set 44 can be compared before the process iterates to the next domain block. Or alternately, many comparisons involving the same blocks can occur during the single iteration, and an average score can be generated for the domain block. If the last domain block has been reached at decision 106, then classification data is generated based upon at least the two levels of matching, as shown at step 108, and then a determination is made as to whether iteration of the matching process is necessary, as shown at decision 110. If iteration is necessary at decision 110, then the process iterates to step 84 and begins to preprocess the image data once again. Otherwise, if iteration is not necessary at decision 110, then the likelihood of a match is output to indicate which domain blocks are likely matches for the target images, as shown at step 112. Then the image recognition process is terminated.

The classification data and likelihood of similarity can vary continuously with altered parameters during the transformation of the image data, the target image, or both. An example is further blurring of the target image, as shown in FIG. 5, until the classification data reaches a predetermined threshold. While it is preferred that the classification data indicates maximum similarity only when one image is locally an affine transformation of the other, the level of matching should be a reliable indicator that a match is possible such that human review of at least the specific domain block is needed.

It can thus be seen that the present invention provides a method for recognizing one or more images within digitized image data including the steps of digitizing image data (step 82); generating a set of domain blocks from the image data (step 86), where each domain block representing a discrete portion the image data as shown in FIG. 2; generating a set of range blocks from a predetermined one or more target images that are desired located within the image data (FIG. 6), the range blocks corresponding to discrete portions of the one or more target images, and the range blocks are transformed by one or more substantially affine transformations with predetermined coefficients; comparing each domain block with one or more of the range blocks (step 94); while comparing, generating classification data based upon a measurement of whether matching is achieved when a range block representing at least a portion of the one or more target images is similar to a domain block, and at least a measurement of whether better matching is achieved when a range block is chosen from image data representing the image which is the source of the domain block (decision 102); and determining the likelihood of at least a specific portion of one or more target images being similar to specific portions of the image data based upon the classification data. The method can include the step of preprocessing the image data in a predetermined manner, such as scaling images to a predetermined size, segmenting the image data, or marking certain image areas to be ignored during the comparison of each domain block with one or more range blocks. The method can also include iterating the steps of image recognition based upon the classification data, as shown by decision 110.

The step of generating a set of range blocks by one or more substantially affine transformations can be generating a set of range blocks by at least spectral translation, spatial translation, or one or more rotations. The method can further include the step of correlating image data and target images with the classification data, and such correlation can be between specific portions of a target image with correlations between portions of image data.

The step of generating classification data can be indicating maximum similarity only when the target image is locally an affine transformation of the other at least one searchable image in the image data. Further, the step of generating a set of range blocks can generating the range blocks with different affine transformations applied to different range blocks based on pre-determined criteria, thereby creating additional range blocks as shown in the range set 44 of FIG. 6.

The step of determining the likelihood of at least a specific portion of one or more target images being similar to specific portions of the image data can be determining the likelihood of similarity by using a function of two variables with values between 0 and 1, wherein the first variable is a specific portion of a target image and the second variable is a specific portion of the image data. Moreover, the step of generating a set of range blocks from a predetermined one or more target images can be generation of a set of range blocks from one or more target images within the image data itself.

In view of the method being executable on the computer platform of a computing device such as computer 10, the present invention includes a program resident in a computer readable medium, where the program directs a server or other computing device having a computer platform to perform the steps of the method. The computer readable medium can be the memory of the computer 10, or can be in a connective database. Further, the computer readable medium can be in a secondary storage media that is loadable onto a wireless device computer platform, such as a magnetic disk or tape, optical disk, hard disk, flash memory, or other storage media as is known in the art.

In the context of FIGS. 7–8B, the method may be implemented, for example, by operating portion(s) of a network to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory, flash memory cards, an optical storage device (e.g. CD-ROM, WORM, DVD, digital optical tape), or other suitable data storage media including digital and analog transmission media.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. An apparatus for unconstrained recognition of one or more images within digitized image data, comprising at least one processor that:

receives image data in a digital format;

generates a set of domain blocks from the image data, each domain block representing a discrete portion of the image data;

generates a set of range blocks from a predetermined one or more target images that are desired located within the image data, the range blocks corresponding to discrete portions of the one or more target images, and the range blocks are transformed by one or more substantially affine transformations with predetermined coefficients;

compares each domain block with one or more of the range blocks;

while comparing, generates classification data based upon a measurement of whether the comparison is closer when one or more range blocks represent at least a portion of the one or more target images, or the comparison is closer when one or more range blocks represent at least a portion of the image data representing the image which is the source of the domain block, the classification data including an adjustment for error; and determines the likelihood of at least a specific portion of one or more target images being similar to specific portions of the image data based upon the classification data.

2. The apparatus of claim 1, wherein the processor preprocesses the image data in a predetermined manner after receipt thereof.

3. The apparatus of claim 2, wherein the processor preprocess the image data through scaling images to a predetermined size.

4. The apparatus of claim 2, wherein the processor preprocesses the image data through segmenting the image data.

5. The apparatus of claim 2, wherein the processor preprocesses the image data through marking certain image areas to be ignored during the comparison of each domain block with one or more range blocks.

6. The apparatus of claim 1, wherein the substantially affine transformations comprise compositions of spatial rotations and spectral and spatial translation and scaling.

7. The apparatus of claim 1, wherein the processor iterates the steps of image recognition based upon the classification data.

8. The apparatus of claim 7, wherein the processor further correlates image data and target images with the classification data.

9. The apparatus of claim 8, where some or all of the image data is video.

10. The apparatus of claim 9, wherein the processor further correlates specific portions of a target image with correlations between portions of image data.

11. The apparatus of claim 1, wherein the classification data indicates maximum similarity only when each domain block of the target image is an affine transformation of at least one range block.

12. The apparatus of claim 1, wherein the processor generates a set of range blocks with different substantially affine transformations applied to different range blocks based on pre-determined criteria, thereby creating additional range blocks.

13. The apparatus of claim 1, wherein the likelihood of similarity is determined by using a function of two variables with values between 0 and 1 and the first variable is a specific portion of a target image and the second variable is a specific portion of the image data.

14. The apparatus of claim 1, wherein the one or more target images are selected from the image data.

15. An apparatus for unconstrained recognition of one or more images within digitized image data, comprising:

means for receiving image data in a digital format;

means for generating a set of domain blocks from the image data, each domain block representing a discrete portion of the image data;

means for generating a set of range blocks from a predetermined one or more target images that are desired located within the image data, the range blocks corresponding to discrete portions of the one or more target images, and the range blocks are transformed by one or more substantially affine transformations with predetermined coefficients;

means for comparing each domain block with one or more of the range blocks;

means for generating classification data based upon a measurement of whether matching is achieved when a range block representing at least a portion of the one or more target images is similar to a domain block, and at least a measurement of whether better matching is achieved when a range block is chosen from image data representing the image which is the source of the domain block, the classification data including an adjustment for error; and means for determining the likelihood of at least a specific portion of one or more target images being similar to specific portions of the image data based upon the classification data.

16. A method for unconstrained recognition of one or more images within digitized image data, comprising the steps of:

digitizing image data;

generating a set of domain blocks from the image data, each domain block representing a discrete portion of the image data;

generating a set of range blocks from a predetermined one or more target images that are desired located within the image data, the range blocks corresponding to discrete portions of the one or more target images, and the range blocks are transformed by one or more substantially affine transformations with predetermined coefficients;

comparing each domain block with one or more of the range blocks;

while comparing, generating classification data based upon a measurement of whether matching is achieved when a range block representing at least a portion of the one or more target images is similar to a domain block, and at least a measurement of whether better matching is achieved when a range block is chosen from image data representing the image which is the source of the domain block, the classification data including an adjustment for error; and determining the likelihood of at least a specific portion of one or more target images being similar to specific portions of the image data based upon the classification data.

17. The method of claim 16, further comprising the step of preprocessing the image data in a predetermined manner.

18. The method of claim 17, wherein the step of preprocessing the image data is scaling images to a pre-determined size.

19. The method of claim 17, wherein the step of preprocessing the image data is segmenting the image data.

20. The method of claim 17, wherein the step of preprocessing the image data is marking certain image areas to be ignored during the comparison of each domain block with one or more range blocks.

21. The method of claim 16, wherein the step of generating a set of range blocks by one or more substantially affine transformations comprises generating a set of range blocks by at least spectral translation.

22. The method of claim 16, wherein the step of generating a set of range blocks by one or more substantially affine transformations comprises generating a set of range blocks by at least spatial translation.

23. The method of claim 16, wherein the step of generating a set of range blocks by one or more substantially affine transformations comprises generating a set of range blocks by at least one or more rotations.

24. The method of claim 16, further comprising the steps iterating the steps of image recognition based upon the classification data.

25. The method of claim 24, further comprising the step of correlating image data and target images with the classification data.

26. The method of claim 25, further comprising the step of correlating specific portions of a target image with correlations between portions of image data.

27. The method of claim 16, wherein the step of generating classification data is indicating maximum similarity only when the target image is locally an affine transformation of the other at least one searchable image in the image data.

28. The method of claim 16, wherein the step of generating a set of range blocks is generating the range blocks with different affine transformations applied to different range blocks based on pre-determined criteria, thereby creating additional range blocks.

29. The method of claim 16, wherein the step of determining the likelihood of at least a specific portion of one or more target images being similar to specific portions of the image data is determining the likelihood of similarity by using a function of two variables with values between 0 and 1, wherein the first variable is a specific portion of a target image and the second variable is a specific portion of the image data.

30. The method of claim 16, wherein the step of generating a set of range blocks from a predetermined one or more target images is generating a set of range blocks from one or more target images within the image data.

31. A method for constrained recognition of one or more images within digitized image data, comprising the steps of:

a step for digitizing image data;

a step for generating a set of domain blocks from the image data, each domain block representing a discrete portion of the image data;

a step for generating a set of range blocks from a predetermined one or more target images that are desired located within the image data, the range blocks corresponding to discrete portions of the one or more target images, and the range blocks are transformed by one or more substantially affine transformations with predetermined coefficients;

a step for comparing each domain block with one or more of the range blocks;

a step for generating classification data based upon a measurement of whether matching is achieved when a range block representing at least a portion of the one or more target images is similar to a domain block, and at least a measurement of whether better matching is achieved when a range block is chosen from image data representing the image which is the source of the domain block, the classification data including an adjustment for error; and a step for determining the likelihood of at least a specific portion of one or more target images being similar to specific portions of the image data based upon the classification data.

32. A computer program that when executed by computer device causes the unconstrained recognition of one or more images within digitized image data through performing the steps of:

digitizing image data;

generating a set of domain blocks from the image data, each domain block representing a discrete portion of the image data;

generating a set of range blocks from a predetermined one or more target images that are desired located within the image data, the range blocks corresponding to discrete portions of the one or more target images, and the range blocks are transformed by one or more substantially affine transformations with predetermined coefficients;

comparing each domain block with one or more of the range blocks;

while comparing, generating classification data based upon a measurement of whether matching is achieved when a range block representing at least a portion of the one or more target images is similar to a domain block, and at least a measurement of whether better matching is achieved when a range block is chosen from image data representing the image which is the source of the domain block, the classification data including an adjustment for error; and determining the likelihood of at least a specific portion of one or more target images being similar to specific portions of the image data based upon the classification data.

* * * * *